UNITED STATES PATENT OFFICE.

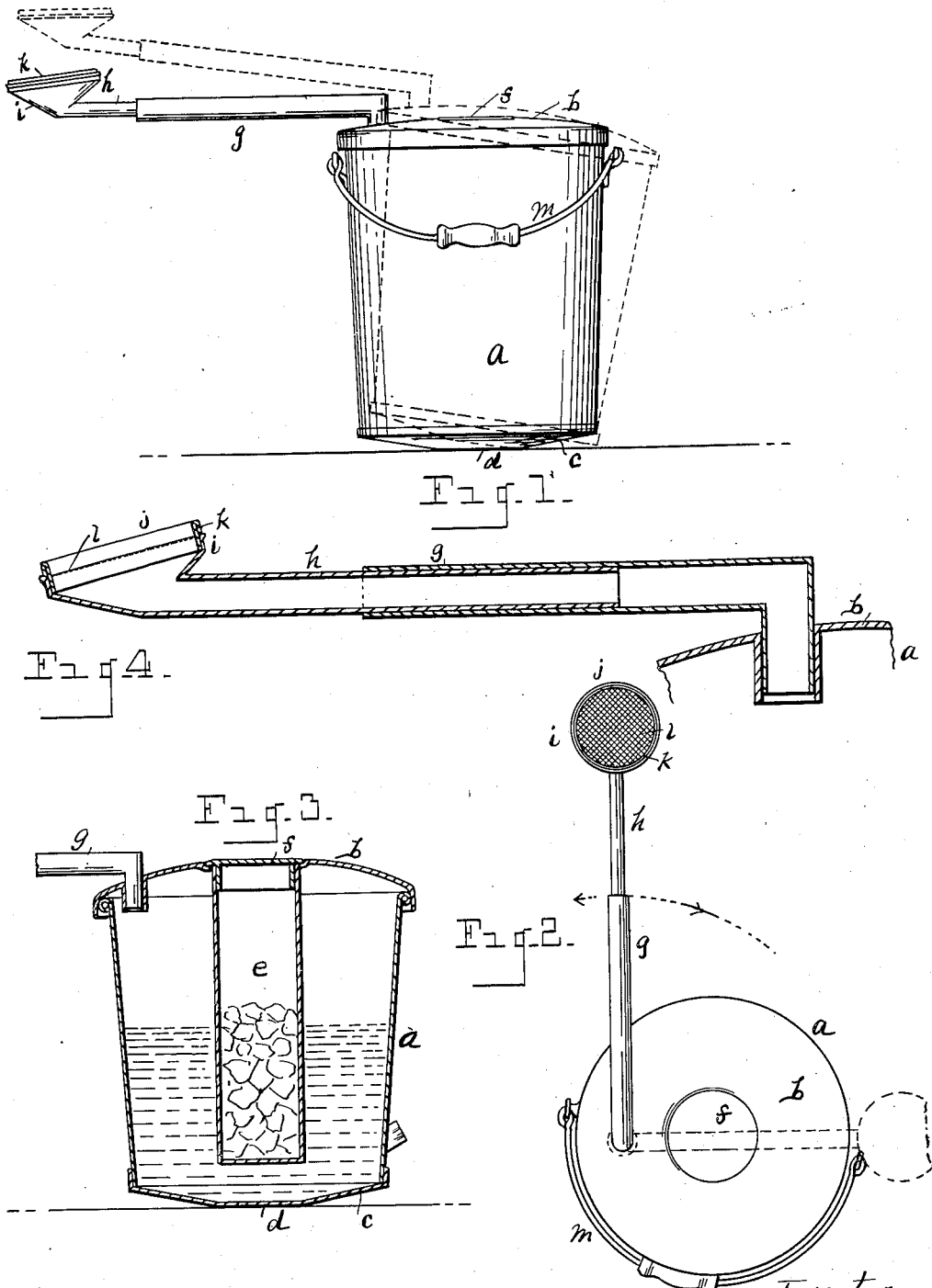

SOLOMON E. OVIATT, OF LANSING, MICHIGAN.

MILK-PAIL AND ANALOGOUS ARTICLE.

No. 832,556.      Specification of Letters Patent.      Patented Oct. 2, 1906.

Application filed November 27, 1905. Serial No. 289,297.

*To all whom it may concern:*

Be it known that I, SOLOMON E. OVIATT, a citizen of the United States, residing at Lansing, county of Ingham, State of Michigan, have invented a certain new and useful Improvement in Milk-Pails and Analogous Articles, of which the following is a specification, reference being had to the accompanying drawings, which form a part of this specification.

My invention is designed to provide an improved milk-pail and analogous articles; and it consists of the construction, combination, and arrangement of devices hereinafter claimed, described, and illustrated in the accompanying drawings, in which—

Figure 1 is a view in side elevation. Fig. 2 is a view in plan. Fig. 3 is a view in vertical section. Fig. 4 is an enlarged section through the tubular arm and strainer.

My invention is designed to provide a utensil which may be used for a milk-pail more especially and parts of which may also be used for other purposes within the scope of my invention.

As adapted for a milk-pail my invention is designed to provide a utensil provided with an adjustable strainer leading into the chamber for containing milk and whereby the milk may be shielded from offensive odors, insect life, &c.

I carry out my invention as follows: In the drawings, *a* represents a pail or milk-receptacle, and *b* represents a cover therefor. The bottom of the pail is indicated at *c* and is preferably made protuberant on its under surface, so that the pail may readily be tilted in any desired direction. At the center of the bottom I prefer also to provide a flat surface of suitable dimensions to support the pail normally in upright position, such flat surface being indicated at *d*. My invention contemplates providing the cover with a refrigerating-chamber, (indicated at *e*,) said refrigerating-chamber opening through the cover and provided with suitable closing-cap, (indicated at *f*,) resting upon the top of the cover of the pail, the construction being such that ice may readily be put into the refrigerating-chamber with the object of cooling the contents of the chamber. The cover is also provided with a swinging tubular arm, (indicated at *g*,) its inner end leading through the cover, preferably at an angle, as shown. In the outward end of the tubular arm is telescoped an additional tubular arm *h*, which may be drawn outward or forced inward, as circumstances may require, so as to lengthen or shorten the combined tubular arms. The outer end of the outer tubular arm is provided with any suitable basin, (indicated at *i*,) communicating with the corresponding arm. Upon the top of the basin is located a strainer-cap, (indicated at *j*,) fitting into the top of said basin. The strainer-cap may consist, essentially, of a metal rim, (indicated at *k*,) upon the inner periphery of which is secured any suitable wire or other strainer, (indicated at *l*.) The strainer-cap is removable from the basin, so that the two may be readily cleansed and the strainer renewed, if necessary. The strainer-cap is preferably elevated to a little distance from the bottom of the basin. In milking, the stream is directed upon the strainer-cap and is in contact with the atmosphere but for an instant. The strainer of course removes any floating impurities of the milk, which quickly passes into the body of the pail and in contact with the ice in the refrigerating-chamber, so that by the time the party is through milking the milk has already become quite cold or lowered in its temperature sufficient for all desired purposes. The pail is provided, preferably, with a bail, (indicated at *m*,) secured thereto in the customary manner. The pail is to serve as a stool and the milk is conducted therethrough as desired through the extensible swinging tube. It will be obvious that by making the tube to swing to right or left the strainer may readily be moved into position for milking to keep it under the udder of the cow in case the cow should move about and being extensible facilitates the keeping of the strainer in desired position. The bottom of the pail being constructed as described also enables the operator to tilt the pail backward or forward or laterally in either direction, as may be required, to bring the strainer into position and proximity to the udder.

What I claim as my invention is—

1. A combined milk stool and pail comprising a pail formed with a protuberant bottom permitting the pail to be tilted in any desired direction, a cover for said pail, an extensible tubular arm connected with said cover and communicating with the interior of the pail provided with a basin and a strainer at the outer end of said arm, all constructed and arranged substantially as and in the manner described.

2. A combined milk stool and pail comprising a pail having a protuberant bottom provided with a flat surface at the center of the bottom to support the pail normally in upright position, the periphery of the bottom rising outward from the margin of the central flat portion to permit the pail to be tilted in any desired direction, a removable cover provided with a refrigerator-chamber projecting therethrough into the body of the pail, a cover or cap for the refrigerator-chamber, and an extensible tubular arm provided with a basin, and a removable strainer, all constructed and arranged substantially as and in the manner described.

In testimony whereof I have signed this specification in the presence of two subscribing witnesses.

SOLOMON E. OVIATT

Witnesses:
  N. S. WRIGHT,
  A. M. MURPHY.